(12) United States Patent
Manieri et al.

(10) Patent No.: US 10,080,948 B2
(45) Date of Patent: Sep. 25, 2018

(54) SELF-CONTAINED PORTABLE RETRACTABLE SPORTS TRAINING BACKDROP APPARATUS

(71) Applicant: MC GOLF LLC, Berkeley Heights, NJ (US)

(72) Inventors: Joseph Manieri, Berkeley Heights, NJ (US); James Wickstead, Mendham, NJ (US)

( * ) Notice: Subject to any disclaimer, the term of this patent is extended or adjusted under 35 U.S.C. 154(b) by 0 days.

(21) Appl. No.: 15/605,026

(22) Filed: May 25, 2017

(65) Prior Publication Data
US 2017/0340945 A1 Nov. 30, 2017

Related U.S. Application Data

(60) Provisional application No. 62/341,535, filed on May 25, 2016.

(51) Int. Cl.
| | |
|---|---|
| A63B 69/00 | (2006.01) |
| A63B 71/02 | (2006.01) |
| A63B 69/36 | (2006.01) |
| G03B 21/58 | (2014.01) |

(52) U.S. Cl.
CPC ........ *A63B 71/022* (2013.01); *A63B 69/0002* (2013.01); *A63B 69/36* (2013.01); *G03B 21/58* (2013.01); *A63B 2209/08* (2013.01); *A63B 2210/50* (2013.01); *A63B 2225/09* (2013.01)

(58) Field of Classification Search
CPC ... A63B 71/022; A63B 69/0002; A63B 69/36; A63B 2209/08; A63B 2210/50; A63B 2225/09; G03B 21/58

USPC ....... 473/151, 197, 421, 415, 422, 465, 435, 473/439, 454, 462; 359/461, 443; 160/351, 113, 119
See application file for complete search history.

(56) References Cited

U.S. PATENT DOCUMENTS

| | | | | |
|---|---|---|---|---|
| 4,153,246 A | * | 5/1979 | Byrne | A63B 63/00 473/197 |
| 4,183,524 A | * | 1/1980 | Kifferstein | A63B 63/00 473/197 |
| 4,523,760 A | * | 6/1985 | Bednarczuk | A63B 63/00 473/197 |
| 4,556,219 A | * | 12/1985 | Tillery | A63B 63/00 473/197 |
| 4,629,188 A | * | 12/1986 | Mahieu | A63B 63/00 473/454 |
| 5,116,056 A | * | 5/1992 | Schmutte | A63B 63/00 473/197 |
| 5,409,230 A | * | 4/1995 | Dunaway | A63B 69/3676 473/160 |
| 6,482,112 B1 | * | 11/2002 | Betz | A63B 71/022 473/421 |
| 6,485,373 B1 | * | 11/2002 | Stephens | A63B 63/00 473/197 |

(Continued)

*Primary Examiner* — Mitra Aryanpour
(74) *Attorney, Agent, or Firm* — Baldini Law, LLC; Jack B. Baldini, Esq.

(57) ABSTRACT

A self-contained, portable and retractable apparatus is described that transforms a sufficient smaller space into a suitable place, either indoors or outdoors, where a large space is unavailable, into a practice facility for sporting activity skills. This backdrop apparatus allows practice of hitting or throwing of a ball or other object in a contained environment and may also be used for virtually playing at any famous location.

9 Claims, 7 Drawing Sheets

(56) References Cited

U.S. PATENT DOCUMENTS

| | | | | |
|---|---|---|---|---|
| 6,543,778 B2* | 4/2003 | Baker | ................... | F41J 1/10 |
| | | | | 273/403 |
| 7,297,076 B2* | 11/2007 | Pohrer | ................... | A63B 61/00 |
| | | | | 473/421 |
| 7,489,443 B2* | 2/2009 | Congard | ................ | G03B 21/58 |
| | | | | 359/461 |
| 8,164,830 B2* | 4/2012 | Astill | ..................... | A63B 71/04 |
| | | | | 160/241 |
| 8,274,737 B2* | 9/2012 | Wang | ................... | G03B 21/58 |
| | | | | 359/443 |
| 9,289,673 B1* | 3/2016 | Allen | ................... | A63B 71/022 |
| | | | | 473/197 |
| 2012/0322567 A1* | 12/2012 | Manieri | ............... | A63B 71/022 |
| | | | | 473/197 |
| 2017/0340945 A1* | 11/2017 | Manieri | ............... | A63B 71/022 |
| | | | | 473/197 |

* cited by examiner

SELF-CONTAINED PORTABLE RETRACTABLE SPORTS TRAINING BACKDROP APPARATUS

This application claims priority to Provisional U.S. Patent Application Ser. No. 62/341,535, filed May 25, 2016.

FIELD OF THE INVENTION

A backdrop apparatus that allows practice of hitting or throwing of a ball or other object in a contained environment is described. The apparatus is self-contained, portable and retractable and transforms a sufficient space into a suitable place, either indoors or outdoors, where a large field is unavailable, to practice certain sporting activity skills. The device may be further configured with computer technology to create a virtual playing field or course.

BACKGROUND

Becoming adept at any sporting activity requires practice that sometimes requires a large field. For example, hitting a baseball or golf ball typically requires continual, periodic practicing in a large open space where the ball can travel several hundred feet or yards and not do any damage. Unfortunately, access to such a large open space is often unavailable and such availability is oftentimes seasonal or effected by weather. Consequently, most people simply do not have the opportunity to practice their chosen sporting skill often enough to become an accomplished player. Some people would also love to be able to play in famous places like Yankee Stadium or Augusta National.

If there were an inexpensive, unobtrusive device which could be easily erected within the confines of a residential home, office or pro shop and which kept balls or other objects from flying as far as they typically might, and may also provide a projection and targeting means but would not hinder the full swing or other launch process of the player, that could be used almost anywhere, indoors or outdoors, even the amateur players would be able to practice more. Of equal importance, if the backdrop could quickly and easily be folded and rolled away, or otherwise hidden, allowing the space to be converted back to its normal residential or other use, it would be more acceptable in a home or limited space environment.

There have been attempts to provide backdrops to contain batted or struck balls or other objects. For example, U.S. Pat. No. 4,523,760, entitled, "PORTABLE GOLF DRIVING NET ASSEMBLY" to Bednardczuk, discloses, "a portable golf driving net assembly which is simple to assemble and disassemble. The net is formed of a frame and a net is wrapped around the frame and secured thereto by passing separate lacing members through the wrapped portions of the net which overlap the top and side members of the frame, and through the corresponding non-overlapped portions of the net. The net is quickly removed from the frame by removing the lacing members."

In another example, U.S. Pat. No. 4,153,246, entitled, "SPORTS NET" to Byrne, discloses, "a sports net and the mounting structure therefor which are of some height and width used for play or practice of golf, tennis, basketball, baseball or the like and secured to a one or two car garage and mounted in the garage above the top frame. The netting is of scrim, i.e., a coarse, open weave fabric on a plastic roller with a reel and axle support means for storing and lowering the netting. The sports net may be used in the garage for golf or tennis practice in inclement weather or out of doors with the garage door open. The mounting is between the lower edge of the raised garage door and the frame when the garage is raised."

In another example, U.S. Pat. No. 4,556,219, entitled, "GOLF PRACTICE CAGE" to Tillery, discloses, "a golf practice cage having a plurality of nets defining a boxlike enclosure open at the front. The nets are attached to a rigid frame by a plurality of attachment members which locate the net in spaced relation to the frame so that rebounding of flying golf balls is prevented. A pair of free hanging rebound nets at the back of the enclosure absorb impact forces and also prevent golf ball rebound. The net defining the floor is trained at its forward extremity about a lateral frame element which is longitudinally movable to adjust the tension of the floor net. Tension elements are arranged to underlie the floor net to keep it from sagging, and a section of damping material such as carpeting overlies the floor net to prevent golf ball rebound and to define a sloping, generally planar surface to cause golf balls to roll to a collection section at the front of the golf practice cage."

In another example, U.S. Pat. No. 5,409,230 entitled, "BOOTH FOR PRACTICING GOLF INDOORS" to Dunaway, discloses, "a practice booth for golf with a putting pan which serves a number of functions. The pan itself retains the lower edges of net like walls of the booth, and gathers end supports these walls when the pan is hoisted by ropes or cables to the supporting roof of the room in which the booth is erected. The putting pan is made of bendable but ridged hollow sections which permit the upper surface to be warped to simulate variations in lies of putting greens. Alternative carpet like coverings are available to change the putting surface characteristics. A removable target for chipping or driving attaches to one net wall of the booth. The target is made of a foam elastomer slab which dents easily to mark the impact of the driven ball, but slowly restores to its original flat shape after a time."

In another example, U.S. Pat. No. 6,482,112, entitled, "RETRACTABLE SPORTS NET" to Betz, discloses, "an apparatus for the practice of any sport involving a ball that is propelled in the air includes a planar section of netting that is surrounded by an elastic cord. The netting is attached to the elastic cord by a plurality of rings that are attached to the netting and which also encircle the elastic cord. A ceiling plate is attached to the ceiling and it includes a locking mechanism that secures a draw cord in any desired position. The draw cord is used to raise or lower a base tray portion of the apparatus from an upper position proximate the ceiling plate to a lower position of rest upon a floor or ground surface. When the base tray portion is raised it gathers the netting as it is raised until it makes contact with a pair of end caps that are attached to the ceiling plate at opposite ends thereof. In the raised position, the apparatus forms a neat closed assembly that contains the netting. The base tray portion includes a pair of planar end members that are each attached to a center planar member by hinges. The pair of end members are, therefore, adapted to rest flat upon the ground when lowered and to elevate at an angle with respect to the ground when raised. When the end members are flat upon the ground the netting is unfurled and the apparatus is adapted for use to attenuate the kinetic energy of the ball."

In another example, U.S. Pat. No. 7,297,076, entitled, "METHOD AND APPARATUS FOR RETRACTABLE ENCLOSURE" to Pohrer, discloses, "a method for assembling a sports enclosure includes coupling a driving gear to an upper support structure, coupling a net having an upper edge and a lower edge to the upper support structure such that an enclosure is at least partially defined by the net, and coupling the lower edge of the net to the driving gear such that operation of the driving gear raises the net such that the net is folded in an accordion like manner between the upper support structure and the lower edge of the net."

In another example, in PGPub US2012/0322567 A1, entitled, "RETRACTABLE GOLF TRAINING APPARATUS" to Manieri (one of the inventors here), discloses, "An apparatus for assisting in the training of various sporting pursuits, such as golf, is described. In some examples, the training apparatus is a retractable apparatus configured to attach to a ceiling of an indoor space in order to move a net into a suitable position via a rotatable support bar or other similar mechanism."

In another example, U.S. Pat. No. 8,164,830, entitled, "SCREEN ASSEMBLY FOR SIMULATOR" to Astill, discloses, "a screen assembly for a projectile-based simulator is comprised of front, right and left fabric panels that form a hitting bay with a front projector impact screen. Each fabric panel can be raised and lowered with respective roller assemblies that operate unison so that the fabric panels are simultaneously raised and lowered. Zippers are provided between each of the fabric panels that are configured to cause adjacent fabric panels to engage as the panels are lowered and to disengage as the panels are raised to allow the panels to wind upon respective roller assemblies."

In another example, U.S. Pat. No. 8,274,737, entitled, "RETRACTABLE FRAME OF PROJECTION SCREEN" to Wang, discloses, "a retractable frame of a projection screen, which comprises: a receiving case; a rolling shaft; a rolling device; a first support rod having one end laterally extended with an engaging plate having a plate hole, two opposing sides of the engaging plate respectively having an engaging surface; a second support rod having one end extended with two engaging arms, and each engaging arm having an engaging hole; a combination member connected with the second support rod and the first support rod; a top supporter; and a projection screen. When being unfolded, the top supporter is upwardly pulled till the connection location of the second support rod and the first support rod being approximately a line, so the engaging arms can be tightly abutted against the end portions of the engaging surfaces for achieving the objective of support.

Finally, U.S. Pat. No. 7,489,443, entitled, "ROLL-UP PROJECTION SCREEN" to Congard, discloses a, "front projection screen compris[ing] firstly a support layer of substantially black color suitable for rolling onto a roll-up tube, and a weight at its bottom edge, and secondly a projection surface that is substantially white or pale gray, being smaller in size than said support layer, and being fastened to the support layer via a junction at its top edge and overlying the face of the screen that is to receive projection."

The foregoing examples, each taken alone or combined in ways that would be possible to combine, lack the totality of features disclosed herein that, in certain embodiments, provide roll up projection screens and/or projectile backstop protective netting requiring extended width with minimal installation size, all packaged neatly in an unobtrusive, inexpensive, fully portable, retractable backdrop apparatus, that is fully deployable at the touch of a button.

SUMMARY

The present disclosure teaches embodiments that address the need to easily and compactly fit a golf simulation product or other sports training aid and the associated components into a relatively small space, such as an ordinary room within a home, or office, to temporarily convert that room, or area thereof, into a sports training environment. In one embodiment, this is accomplished utilizing a proprietary design that provides folding, then rolling, or, in the alternate direction, unrolling, then unfolding, to achieve a wholly compact form that fits neatly into an unobtrusive housing that may be installed, uninstalled or hidden when not in use. Deployment may be initiated at the touch of a button that unrolls the backdrop, unfolds hidden support arms to extend open the side backdrops that then automatically deploy the supplemental support arms that pull into place a top netting.

DETAILED DESCRIPTION

Figure 1:
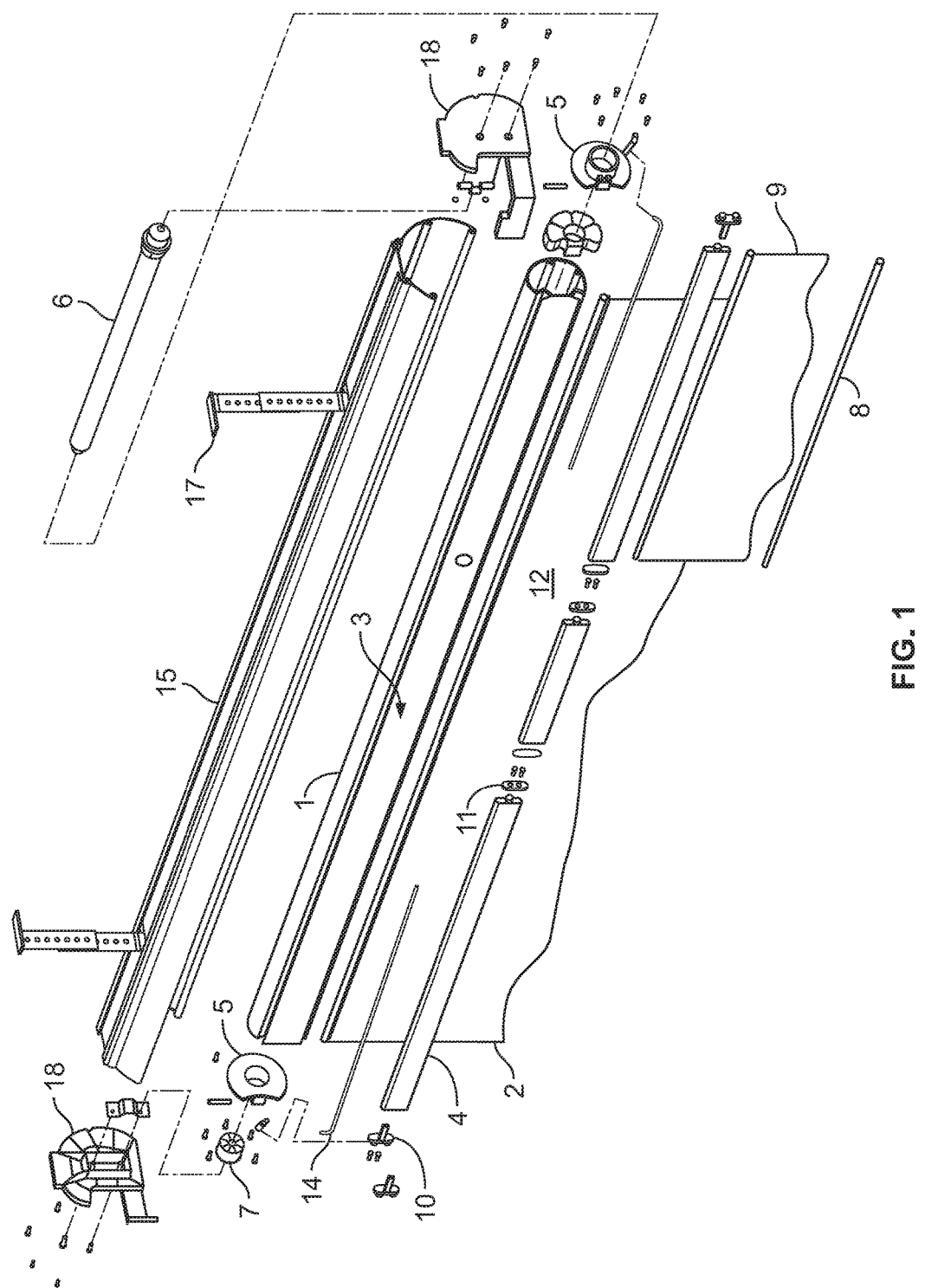
FIG. 1 depicts an exploded view of the salient component parts contained in one embodiment of the teachings herein. A Roller Tube (1) that contains a Recess (3) into which the side netting Support Arms (4) and Supplemental Support Arms (14) (for supporting a top netting—not shown) can pivot into and be hidden is diagrammed unassembled. The Roller Tube (1) has Support End Caps (5) that mount the structure into an Outer Housing (15) via Outer Housing End Caps (18) and support a rollable Backdrop (2) that has a Weighted Rod (8) installed for assisting with unrolling. The Roller Tube may be driven by a Drive Motor (6) inserted into the center of the Roller Tube and attached to a Center Axis Support (7). The Support Arms have attached a Side Backdrop (9) and attach to the Roller Tube End Caps via a Pivot Fixture (10) and further contain Support Arm End Caps (11). When folded into the Recess, the Support Arms and Supplemental Support Arms remain intact with the assistance of a Magnetic Catch (12). Also depicted here is an example of a mounting bracket means (17), in this embodiment, configured to mount the entire mechanism to a ceiling."

For clarity of disclosure, and not by way of limitation, the detailed description set forth is divided into the following subsections that describe or illustrate certain features, embodiments or applications of the present invention.

Definitions

"Roller Tube" as used herein means a substantially circular tube, that may have flattened areas and/or with a recess, to which a backdrop is attached and through which a center axis is located such that it can roll and unroll the attached backdrop and certain attached structures can fold into the recess.

"Recess" as used herein means a concave component of the roller tube into which at least support arms and supplemental support arms may fold and still maintain the substantially circular overall tube shape.

"Support Arm" as used herein means a support structure to which a side backdrop is attached and which can fold into a recess of the roller tube.

"Supplemental Support Arm" as used herein means a support structure to which a top netting is attached and which can fold into the recess of the roller tube.

"Backdrop" as used herein means a suitable flexible material that can attach to the roller tube and/or support arm and roll and unroll as well as absorb sufficient energy from a projectile to stop and restrain said projectile.

"Outer Housing" as used herein means a containing structure that can house the roller tube, support arms and supplemental support arms and backdrops and top netting and contain all in a rolled stored state such that the entire structure is self-contained and unobtrusive.

The System and Method of the Present Invention

In one embodiment, the apparatus disclosed herein incorporates a ballistic projection screen or netting or other appropriate flexible backdrop that attaches at one end to a specialized roller tube that can roll the entire backdrop (the main backdrop, side backdrops and top netting folded flat into the recess on the support arms and supplemental support arms) onto the tube and when rolled, can be fully located within an outer housing that is comprised of an extruded tube and attached end plates. The housing protects the rolled backdrop and also provides a centerline for rolling. In one embodiment, in an active position ready for use, the device described herein provides a partial enclosure suitable to receive, catch, block, and capture objects hit or thrown at it and in certain embodiments, capable of measuring attributes of the said objects such as speed, angle, trajectory and the like. In one embodiment, the device described herein can be rolled and compacted into the outer housing in a configuration that does not impede other uses of the space and stored for later use.

In one embodiment, a motor, a manual crank, or other appropriate method of power allows the assembly to be rolled directly or remotely and also automatically defines the exact location of retraction and extension such that the assembly is not over rolled or over unrolled. This definition of retraction and extension may be mechanical based on predefined length measurements or may incorporate sensors and may be controlled and set by the user to match his particular environment.

In one embodiment, a pivotable support arm is attached at each end of the center screen assembly that holds a section of ballistic projection screen or netting or other appropriate flexible backdrop approximately the same length as the center backdrop material and a width that does not exceed the width of the center backdrop material. Each arm pivots inward and outward such that when pivoted inward, the entire arm is essentially parallel with the center rolling tube and folds into the recess to create an essentially round rolling tube, thus, allowing all backdrops, top netting, and support arms to roll and unroll as one contiguous unit. When pivoted outward, the support arm extends out to some angle less than 180 degrees with the center tube.

In one embodiment, when each pivotable support arm is pivoted inward, there is a recess in the center roller tube within which it comes to rest, forming a continuous radius that allows the projection screen backdrop, both the center section and the side sections and support arms to be rolled or unrolled as a single entity.

In one embodiment, after unrolling to the predefined length, the folded pivotable support arms are pivoted outward to a predefined angle that provides a backdrop with a center section and two side sections.

In one embodiment, when pivoted outward to the fully predetermined outward angle, each pivotable support arm come to rest on support arm rests that are attached to each corresponding end plate of the outer housing. The support arm rests anchor the pivotable support arms and their corresponding attached unrolled backdrop at a specific desired predetermined angle to the center backdrop and prevent any further unrolling or premature re-rolling.

In one embodiment, after the backdrops are unrolled on the roller tube, the support arms on each end pivot and unfold to bring the side backdrops into place. Then, the entire unit as one piece begins to unfold, and, in one embodiment, while that is occurring, at least two additional supplemental support arms also unfold and extend and raise up into place supporting a top netting that stretches across the total width of the unit. In one embodiment, these supplemental arms are pulled open with the unfolding of the top netting. In another embodiment, the supplemental support arms are mechanically geared into place and they pull the top netting into place. In yet another embodiment, there is a cable attached at the far end of the support arms and at the other end to the end of supplemental support arms near the roller tube and as the support arm opens, the cable tension increases pulling the supplemental support arm open. In yet another embodiment, it is a combination of mechanisms that open the supplemental support arms and the top netting into place. In yet another embodiment, the supplemental support arms are pulled into place after the main backdrop and side backdrop are unrolled and unfolded fully into place and expose the supplemental support arms and top netting structure.

In one embodiment, no matter what method is used for connecting and operating the supplemental support arms, upon closing, the reverse of opening occurs releasing the tension on the supplemental support arms and they fold closed into the recess in the roller tube causing the top netting to drape flat across the main backdrop allowing the entire assembly to be neatly rolled onto the roller tube. In one embodiment, a spring mechanism may be employed to assist with the folding back of the supplemental support arms.

When fully rolled, the unit is compact with all support arms (main and supplemental) recessed into the roller tube and all backdrops and top netting neatly rolled onto the roller tube and the entire rolled apparatus contained within the outer housing. The completely stowed unit is unobtrusive and may even be ostensibly mounted in a manner that pivots it into a recess at the mounting spot. Alternatively, in another embodiment, the unit could be bracket mounted and simply slipped off of its bracket and stowed in a closet. In yet another embodiment, the unit could be mounted on a free standing, telescoping pole and when fully rolled, pivoted to be parallel with the pole, the pole then telescoped to a shorter length and the whole thing stowed.

EXAMPLES

The present invention is further illustrated, but not limited by, the following examples.

In one embodiment, the device as described herein may be implemented with a golf simulation system wherein the backdrop may be that as used in certain golf simulators that incorporate a video projection screen and are capable of simulating golf courses and recording ball flight and distances. In an alternate embodiment, a similar implementation may be with a baseball field. In this manner, a person can 'play' virtually a famous golf course or play in a famous baseball stadium without ever leaving the confines of his or her home or office or anywhere it is of sufficient space to set up the embodiment as described.

It should be appreciated that the foregoing techniques may be implemented with any sports activity utilizing a restraining backdrop. While the detailed example herein is demonstrated with a golf ball backdrop to restrain struck golf balls, it will be appreciated by one of skill in the art, that the structure should not be so limited and may be used with struck baseballs, thrown baseballs, soccer, archery, lacrosse and the like, each where suitable backdrop materials are utilized and where a high level of directional accuracy is desired.

In one embodiment, a device is designed according to FIG. 1 wherein a central roller tube is attached to a ballistic projection screen backdrop or other protective netting backdrop. The roller tube incorporates a recess designed to allow nesting of two separate support arms one each attached at each end of the roller tube and pivotally so and each in a reverse concave shape such that one folds over the other and when fully nested completes the substantially circular shape of the roller tube. A roller tube end cap attaches at each end of the roller tube and incorporates the pivot point attachment mechanism to pivotally attach the support arms. The end caps also contain a mounting for both a drive motor and a center axis to facilitate the rolling movement of the roller tube. The main backdrop attaches at one end to the roller tube and the side backdrops attach each at one end to each of the two support arms. When the support arms are folded in a nested configuration in the roller tube, the each of the two side backdrops and the main backdrop appear and act as one contiguous material and can roll and unroll onto and from the configured roller as the drive motor rotates the center axis. A weighted rod can be inserted into the bottom of the backdrop materials to facilitate unrolling and to keep the backdrop wrinkle free when rolling.

In one embodiment, the attachment of the backdrop material to the roller tube and/or the support arms is through a containment slide opening that allows for easy attachment and unattachment of the material by simply sliding it in and out wherein the material of the backdrop has an end with a slightly larger profile that cannot directly pull out of the slide opening. The roller tube and/or support arms have an end cap that seals the ends preventing premature sliding of the material out of the slide opening.

In one embodiment, there is a magnetic catch on the recess of the roller tube that can maintain the support arms in the nested folded position. Any suitable mechanism can be employed, such as for example, hook and loop fastener, snaps, etc.

In one embodiment, a drive motor is inserted into the roller tube or attached thereto via the roller tube end cap and is attached to the center axis rod and can be powered via any of a number of known powering mechanisms, such as for example, battery power, direct DC plug in power, AC power, solar power, etc. In one embodiment, the motor can have a remote transceiver that is controlled by a remote operator controlled transmitter. In the absence of power, the unit may be rolled and/or unrolled via a mechanical means such as for example a crank.

In one embodiment, a folding top material, which may be a netting or other suitable material, attaches between the support arms at the top of the main and side backdrops and is supported in place by supplemental support arms that fold outward via a spring mechanism that keeps the top netting material in place overhead the backdrops. In one embodiment, there are support arm and supplemental support arm brackets into which the support arms and supplemental support arms rest when opened. In this manner, the support arms and supplemental support arms are cradled and prevent sagging and additionally prevent the assembly from rolling when in active use where the support arms and/or supplemental support arms are deployed.

In one embodiment, an outer housing is configured to contain the roller tube, support arms, supplemental support arms, backdrops, top netting, motor and all pivot and mounting mechanisms, and on its outer portion, configured to mount the entire mechanism to a wall, ceiling or other suitable mounting area, such as for example a free standing pole.

Figure 2:
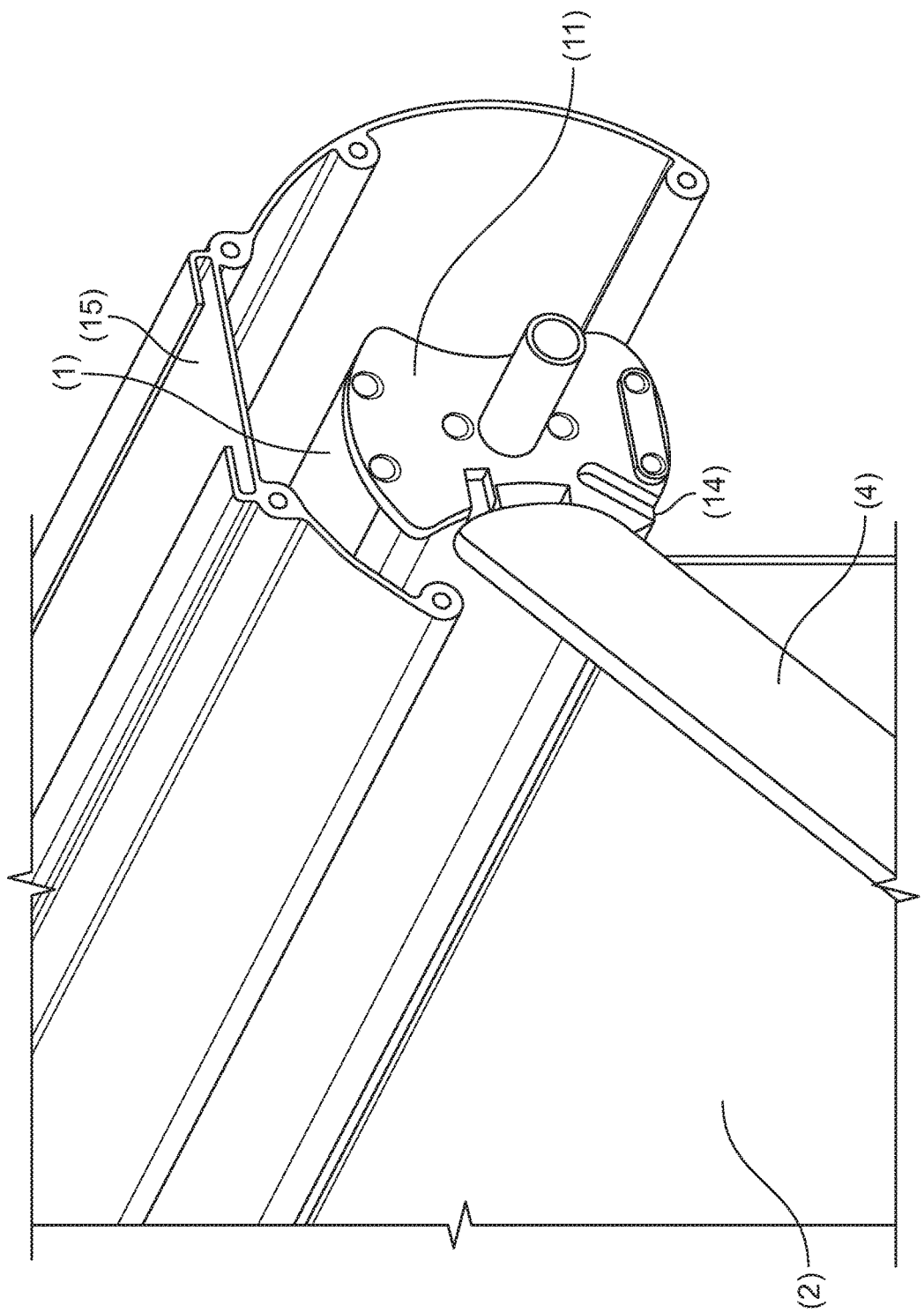
FIG. 2 depicts a close up view of one end of one embodiment of the disclosure herein showing the Roller Tube (1), Roller Tube End Caps (11), Support Arm (4) mounted pivotally to the Roller Tube End Caps, the Supplemental Support Arm (14) and the Backdrop (2) in an assembled state.
Figure 3:
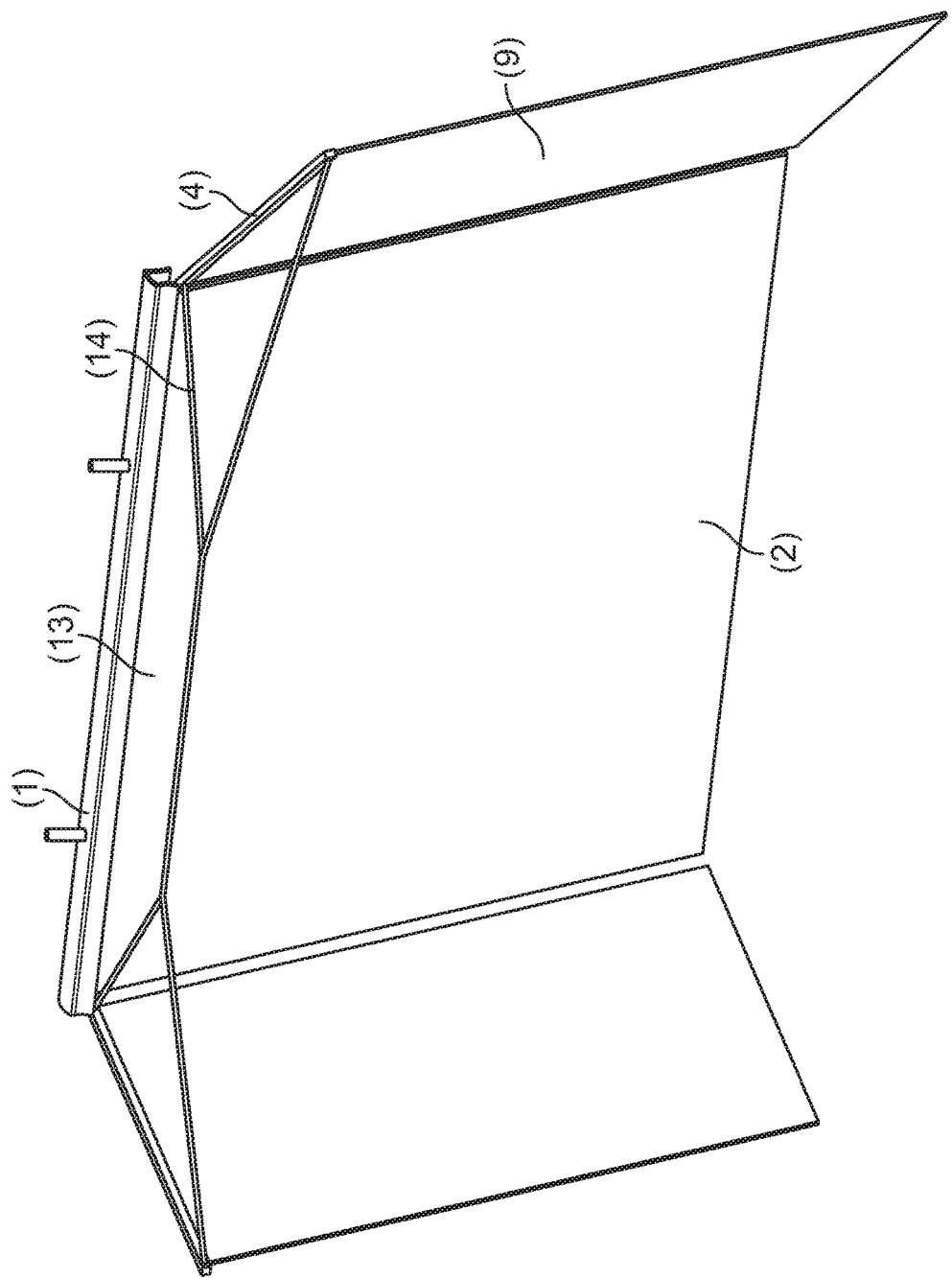
FIG. 3 depicts one embodiment of the main Backdrop (2), the Side Backdrops (9), the Top Netting (13) as supported by the Roller Tube (1) and the Support Arms (4) and Supplemental Support Arms (14) in an opened position.
Figure 4:
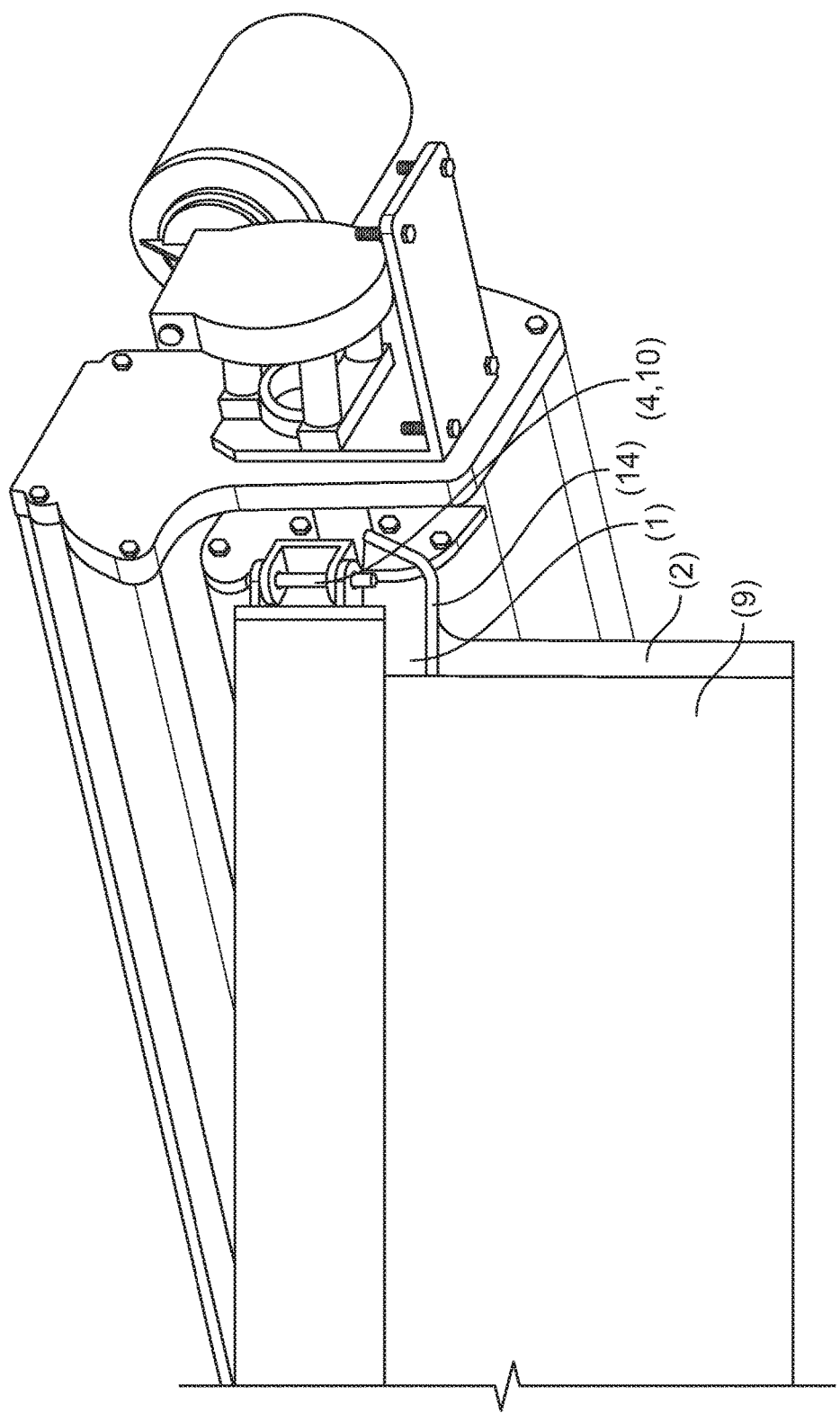
FIG. 4 depicts a close up view of one embodiment of the disclosure herein showing the Support Arm (4) supporting a Side Backdrop (9) and beginning to unfold from the pivot (10) attached to the Roller Tube and its End Cap with the Main Backdrop (2) remaining attached to the Roller Tube (1).
Figure 5:
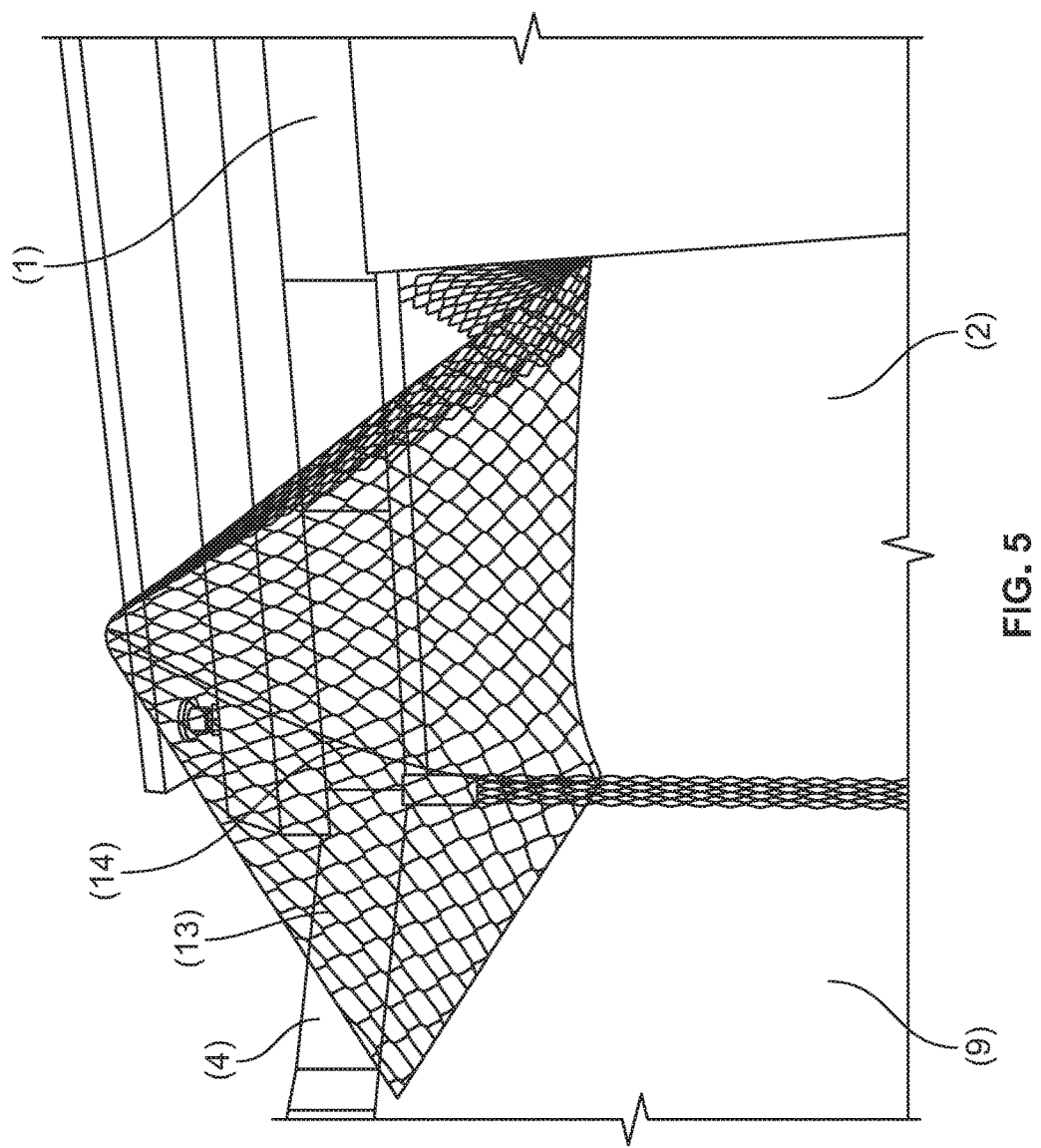
FIG. 5 depicts a close up view of one embodiment of the disclosure herein showing the Support Arm (4) unfolded from the Roller Bar (1) with the Side Backdrop (9) and the Main Backdrop (2) unfolded and attached and the Supplemental Support Arm (14) unfolded into position to support the Top Netting (13).
Figure 6:
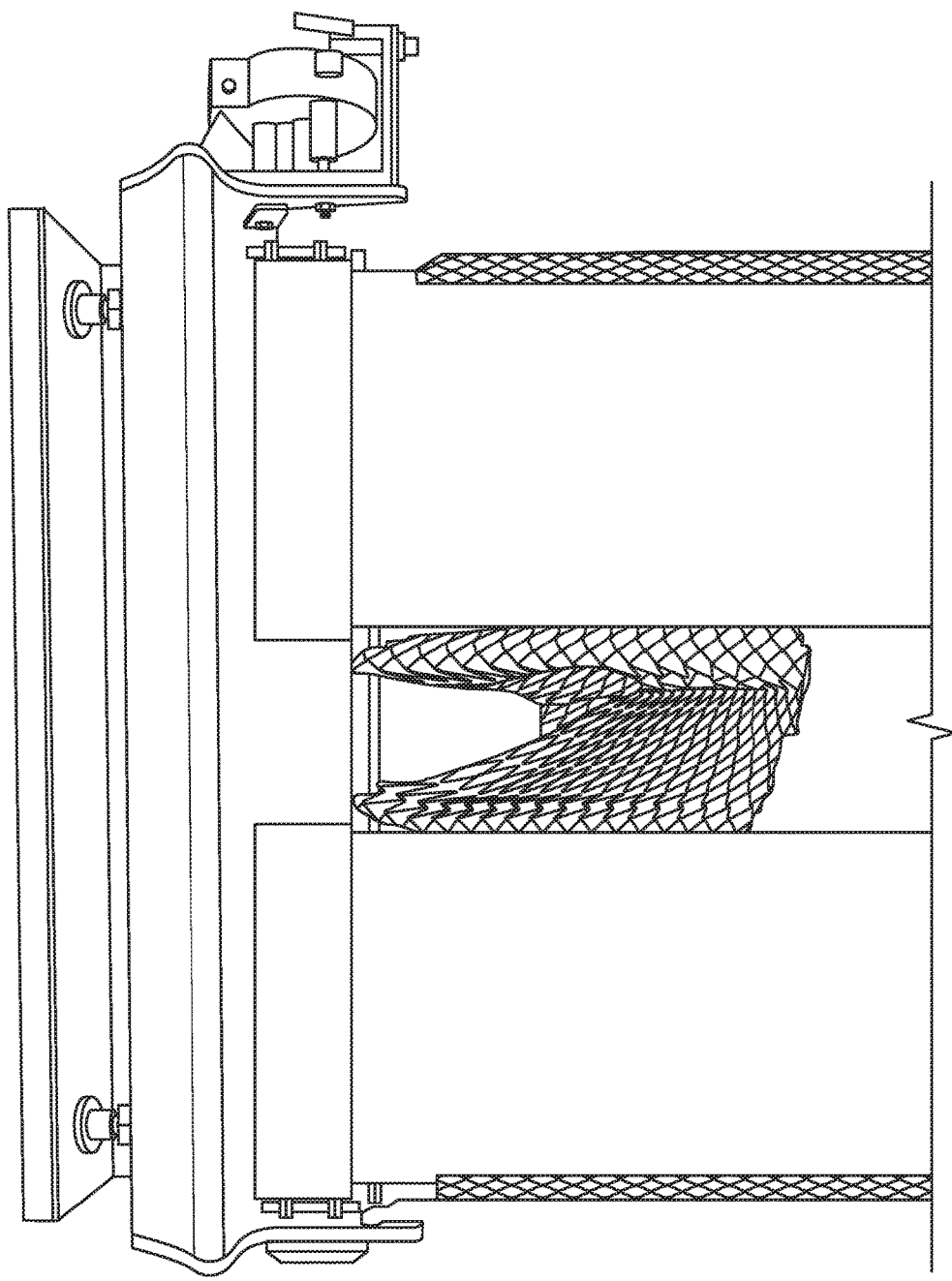
FIG. 6 depicts a view of one embodiment of the disclosure herein where the Support Arms and Supplemental Support Arms are folded into the Recess in the Roller Tube and from this position can either unfold into the deployed and ready to use state or be rolled up and all tucked neatly into the Outer Housing. In the embodiment shown, the unit is mounted to a ceiling. In other non-limiting embodiments, it could be mounted to the wall from behind or in a free standing base unit (much like a portable basketball hoop mounting). In the embodiment shown, the Support Arms have a reverse concave shape such that when folded into the Recess in the Roller Tube, they form the continuous circular shape of the Roller Tube for ease of rolling and unrolling.
Figure 7:
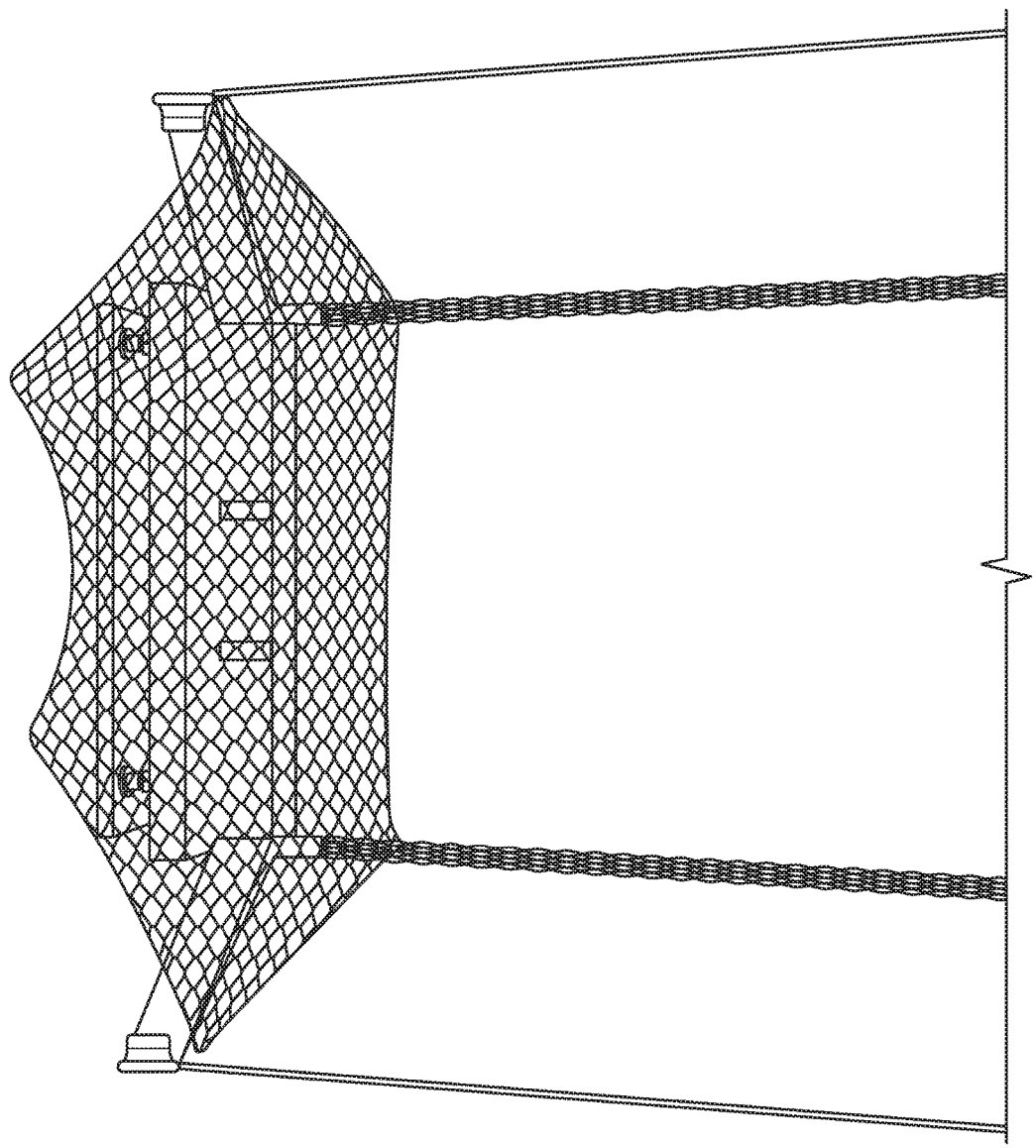
FIG. 7 depicts a view of one embodiment of the disclosure herein where, from the view in FIG. 6, the unit is fully unfolded into place and ready for use.

In an alternate embodiment, and referring to FIG. 2, the roller tube has two recesses, one on each side, one into which the support arms each nest and fold and the other into which the supplemental support arms can fold.

In an alternative embodiment, the entire structure as described herein may further comprise a base section that provides a playing surface for a user to strike a ball therefrom or simply a surface to stand on. In various embodiments, the base section may physically attach to the unrolled ends of the main and side backdrops, may be of various thicknesses and materials to provide a suitable playing surface, may be of various lengths and widths to accommodate the various activities with which the device will be implemented. In one embodiment, the base section may be permanently physically attached to the center main backdrop section such that it may be completely rolled and stored in the device when in the storage configuration.

In one embodiment, the device as described herein may be of various heights and widths suitable for the activity with which it will be used and the space within which it will be used. In a preferred indoor golf practice implementation, the space will have ceilings at least ten feet high to accommodate a full golf swing with various clubs from a driver to irons to wedges. In this embodiment, the main backdrop will be approximately 106" across the main screen. When fully opened, in this embodiment with 36" support arms, the entire width is approximately 135" depending upon the angle desired of the 36" fold out support arms.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A sports projectile backstop apparatus comprising:
an outer housing with and end cap at each end;
a central roller tube configured to rotate about said central ruler tube's longitudinal axis and housed within the outer housing along a center axis bar and comprising an at least one recess;
a center flexible backdrop attached to the central roller tube at a first end and configured to wrap around the central roller tube when the central roller tube rotates in a first direction and to unwrap and suspend from the central roller tube when the central roller tube rotates in a second, opposite direction;
at least two side support arms configured to pivotally attach, one at each end of the central roller tube inside the outer housing end caps, and further configured to nest, one on top of the other in the at least one recess of the central roller tube when folded inward, and further configured to attach a side flexible backdrop;
at least two side flexible backdrops, one each attached to each side support arm at a first end and configured to wrap around the central roller tube and nested folded at least two side support arms when folded in the recess when the central roller tube rotates in a first direction and to unwrap and suspend from the at least two side support arms when the central roller tube rotates in a second, opposite direction and the at least two side support arms unfold;
at least two supplemental support arms configured to pivotally attach, one at each end of the central roller tube inside the outer housing end caps, and further configured to attach and support a top netting material when unfolded and configured to tuck into the at least one recess of the central roller tube on top of the nested folded at least two side support arms when folded; and
a top netting material attached and supported by said central roller tube, and said at least two side support arms and said at least two supplemental support arms.

2. The sports projectile backstop apparatus of claim 1 further comprising:
a means for rotating the center axis bar which is configured to rotate the central roller tube, at least two side support arms and supplemental support arms only when said side support arm and supplemental support arms are folded and nested into the recess of the central roller tube, in both a first direction and an opposite direction.

3. The sports projectile backstop apparatus of claim 1 wherein:
the at least two side support arms configured to substantially complete a circular structure with the central roller tube when folded and nested into the recess.

4. The sports projectile backstop apparatus of claim 1 wherein:
the central roller tube recess comprising a magnetic catch to keep the at least two side support arms in place when folded and nested into the recess.

5. The sports projectile backstop apparatus of claim 1 wherein:
the at least two side support arms and the supplemental support arms further comprising a spring mechanism configured to assist with the unfolding of the at least two side support arms and supplemental support arms when said at least two side support arms and supplemental support arms they-are unlocked out of the support brackets.

6. The sports projectile backstop apparatus of claim 1 wherein the overall dimensions are approximately 135 inches wide when fully opened by approximately 36" deep and less than 10 feet tall.

7. A sports projectile backstop apparatus of claim 1 wherein when the at least two side support arms are unfolded, the at least two supplemental support arms automatically unfold erecting the top netting which is supported above the entire length of the center flexible backdrop and when the at least two side support arms are folded, the at least two supplemental support arms automatically fold flat and within the recess in the central roller tube.

8. The sports projectile backstop apparatus of claim 1 wherein the center flexible backdrop and the at least two side flexible backdrops further comprise a weighted rod along said center flexible backdrop and at least two side flexible backdrops' entire width at said center flexible backdrop and at least two side flexible backdrops' end opposite the attachment to the central roller tube and the at least two support arms.

9. The sports projectile backstop apparatus of claim 1 wherein the center flexible backdrop and the at least two side flexible backdrops are comprised of a material suitable for implementation with a golf simulation system.

* * * * *